United States Patent [19]
Ishida

[11] 3,858,497
[45] Jan. 7, 1975

[54] APPARATUS FOR MANUFACTURING WANTANS CONTAINING FILLERS

[75] Inventor: Masayuki Ishida, Chigasaki, Japan

[73] Assignee: Toyo Suisan Kaisha Ltd., Tokyo, Japan

[22] Filed: Mar. 27, 1973

[21] Appl. No.: 345,254

[52] U.S. Cl.............. 99/450.6, 53/193, 425/294, 425/307, 141/114, 141/166, 141/246, 141/269, 141/315
[51] Int. Cl..... A21c 9/06, A21c 11/00, A21c 11/18
[58] Field of Search............ 99/450.2, 450.6, 450.7; 425/301, 307, 294, 383; 53/193; 141/114, 165, 166, 176, 237, 246, 269, 270, 315

[56] References Cited
UNITED STATES PATENTS

| | | | |
|---|---|---|---|
| 625,739 | 5/1899 | Buerk | 425/294 |
| 2,179,742 | 11/1939 | Heres | 53/193 |
| 2,714,861 | 8/1955 | Castronuovo | 99/450.2 X |
| 2,835,920 | 5/1958 | Smith et al. | 425/301 X |
| 2,868,141 | 1/1959 | Griner | 99/450.4 |
| 3,656,517 | 4/1972 | Taylor | 141/237 X |

*Primary Examiner*—Harvey C. Hornsby
*Assistant Examiner*—Alan Cantor
*Attorney, Agent, or Firm*—Kemon, Palmer & Estabrook

[57] ABSTRACT

An apparatus for manufacturing "wantans containing fillers" comprises cutting means to divide a continuous raw layer into small raw slices, first conveyor for conveying the raw slices with a mounting member on which the raw slices are disposed, second conveyer for conveying cylinders which push the raw slices to form a recess therein and introduce fillers in the formed recess. Said mounting member is provided with a shaping frame thereunder to close the opening of the recess filled with fillers.

9 Claims, 10 Drawing Figures

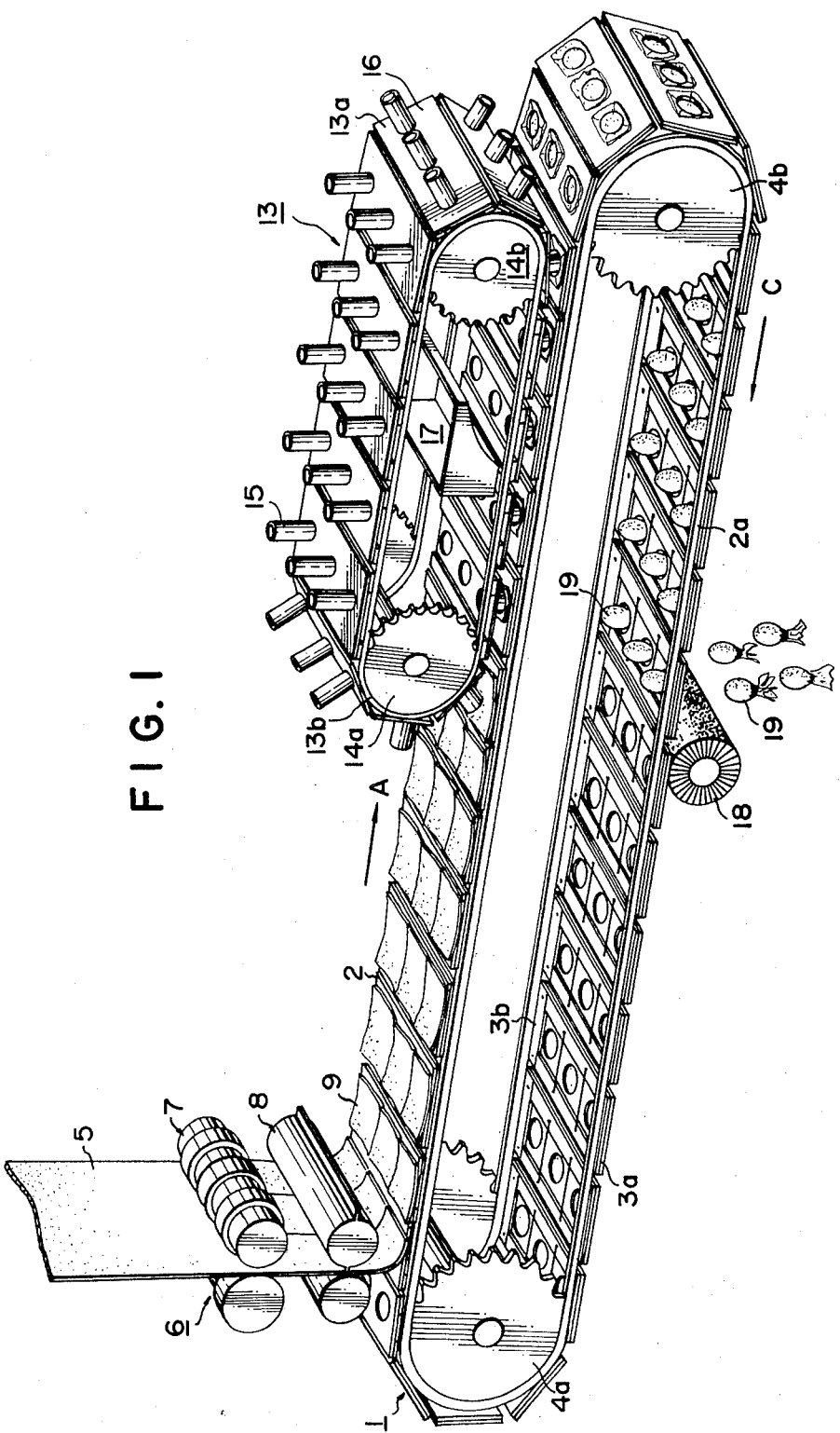

APPARATUS FOR MANUFACTURING WANTANS CONTAINING FILLERS

BACKGROUND OF THE INVENTION

This invention relates to an apparatus for manufacturing "wantans containing fillers."

The term "wantans containing fillers" used in the specification is intended to means a foodstuff manufactured by packing fillers such as minced meats and vegetables into a raw slice made of for example flour, and usually eaten in a state immersed in a suitable soup.

Such wantans have manually each been manufactured due to absence of any mass production apparatus.

SUMMARY OF THE INVENTION

Accordingly, an object of the present invention is to provide an apparatus which may easily manufacture a great number of wantans containing fillers.

BRIEF DESCRIPTION OF THE DRAWINGS

FIG. 1 is a schematic perspective view of an apparatus containing fillers according to one embodiment of the present invention;

DETAILED DESCRIPTION OF THE INVENTION

There will now be described an embodiment of the present invention with reference to the accompanying drawings.

In FIG. 1, numeral 1 shows a first conveyer comprising an endless belt member 2, a pair of chains 3a, 3b attached on the opposite sides of the belt, and a pair of toothed wheels 4a, 4b which are disposed at a predetermined interval and engaged with the respective chains at the outer peripheral parts. The toothed wheel may be driven by means of an electric motor not shown to move the belt in a direction of an arrow A.

Figure 2A:
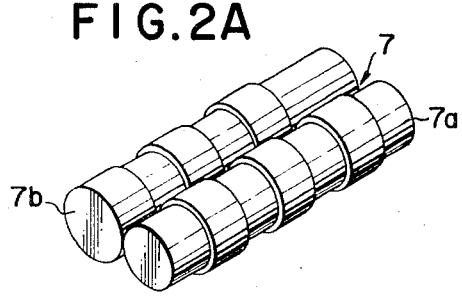
FIGS. 2A and 2B are respectively perspective views of the cutting members as shown in FIG. 1.
Figure 2B:
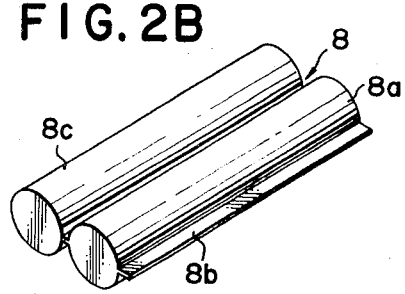

A pair of cutting members 7, 8 are disposed above the one end portion of the conveyer 1, which may cut a continuous raw layer 5 into a plurality of raw slices 9 of wantans. The raw layer may be prepared in a manner well known in this art, for example, in such a manner that flour is kneaded with water to form a part which is further stretched. The upper cutter 7 is designed to slit the raw layer into a plurality of long strips, and the lower cutter 8 to traversely cut the strips into slices 9. For this purpose, as shown in FIG. 2A, the cutter 7 is constructed by two long rollers 7a, 7b having circular ribs formed on the periphery at an interval along its axis. Two rollers 7a, 7b are so arranged in parallel with each other that the corresponding ribs of both rollers are contacted to slit the raw layer. The cutter 8 comprises, as shown in FIG. 2B, one roller 8a provided with two ribs 8b which radially protrude on the opposite sides and extend along the longitudinal axis of the roller, and the other roller 8c with a smooth peripheral surface. One roller 8a is so disposed slightly apart from the other roller 8c that the top of the rib 8b of the former may intermittently contact with the periphery of the latter during the rotation of the rollers. Accordingly the raw strip may be cut to the length corresponding to the contact interval of the ribs 8b to the roller 8c. The cutting means 7, and conveyer 1 are so arranged that the raw slices 9 divided by the former are received and transported by the latter.

Figure 3A:
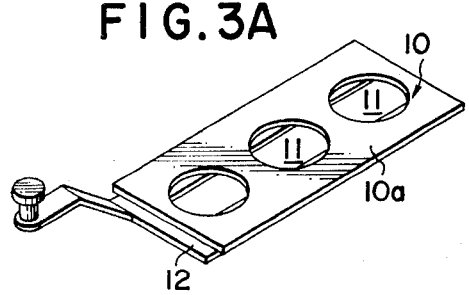
FIG. 3A is a perspective view of the supporting member as shown in FIG. 1.
Figure 3B:
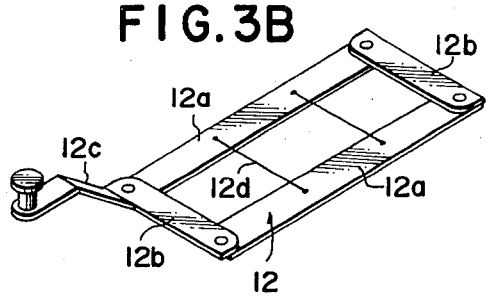
FIG. 3B is a perspective view of the shaping frame of the supporting member which closes the opening of the recess formed in the raw slice and filled with fillers.

The conveyer belt 2 includes a plurality of supporting members 10 juxtaposed in a movement direction of the conveyer. The supporting member 10 is constructed by a supporting flat plate 10a on which the raw slices 9 transferred from the cutting means are mounted, and a shaping frame 12 disposed on the under side of the plate 10, as shown more fully in FIG. 3B. A plurality of through openings 11 (i.e. three circular openings in this preferred embodiment) are perforated in the plate, which are to be covered with raw slices 9. The shaping frame 12 is formed in a rectangular shape of four narrow plates 12a, 12b whose connecting ends are pivoted to allow the frame to be deformed to have a diamond shape. Between the longer plates 12a two metal wires 12d are bridged with their opposite ends connected to the plates 12a. The wires 12d are so arranged that each wire is located between the adjacent openings 11 in the upper plate 10a, and in parallel with the shorter plates 12b. A handle 12c is connected to the corner of the shorter plate 12b to manually or mechanically cause the deformation of the frame.

Figure 4:
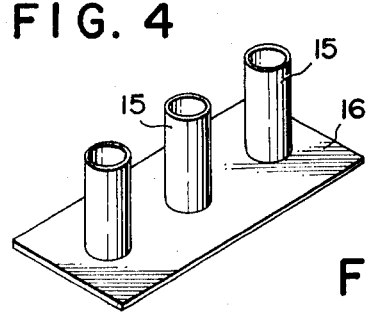
FIG. 4 is a perspective view of a member having cylinders which form a recess in the raw slice and supply fillers therein.

On the end of the conveyer 1, opposite to the end where the cutting means is disposed, there is arranged a second conveyer 13 in parallel with the first conveyer 1. The conveyer 13 includes a conveyer belt 13a, a pair of chains 13b attached to the opposite ends of the belt, and a pair of toothed wheels 14a, 14b engaged with the chains. The belt 13a may be moved through the chains 13b by the wheels 14a, 14b driven by an electric motor not shown, which is constructed by a plurality of plates 16 juxtaposed in a moving direction of the conveyer. As shown in FIG. 4, the plate 16 is provided with three holes and cylinders 15 outwardly extended from the plate to enclose the corresponding hole. Each cylinder 15 may face the corresponding circular opening 10 in the supporting plate 10a so as to push downward the center part of the raw slice 9 disposed at the opening 10, causing said central part to be formed with a recess and then to charge fillers from a filler source 17 into the recess thus formed. While raw slices 9 having the recess filled with fillers are further transferred by the conveyer, the opening of the recess is closed by the deformation of the shaping frame 12 to form wantan. The deformation of the shaping frame is accomplished by gradually moving the handle 12c of the frame which is driven to be synchronized with the conveyer.

On the down side of the conveyer 1, there is disposed a cylindrical brush 18 to forcefully remove the produced wantan containing fillers from the supporting member. The cylindrical brush 18 may be driven by an electric motor when it is disposed apart from the conveyer 1, or conveyer 1 when it is arranged in contact with it.

The operation of the apparatus described above will now be illustrated with reference to FIGS. 5A to 5D.

Figure 5D:
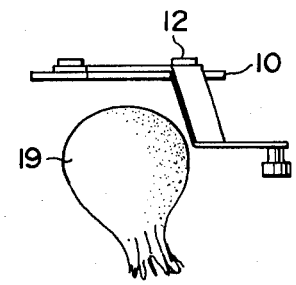
FIGS. 5A to 5D respectively show the steps of manufacturing wantans by using the apparatus of the embodiment.
Figure 5A:
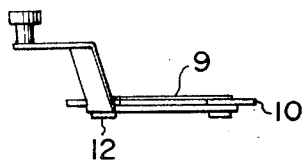
Figure 5B:
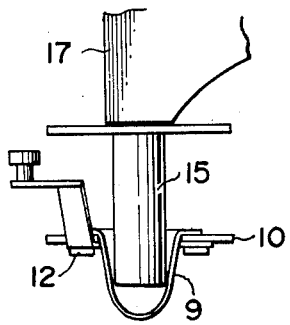
Figure 5C:
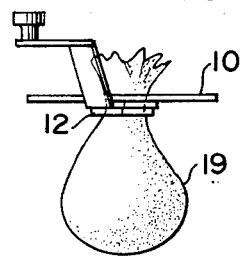

The raw slices 9 divided from the continuous layer by the cutting means are mounted on the supporting plate with their central part closing the opening 11, and transferred in a direction of an arrow A. In this case, the shaping frame 12 is not deformed, that is, the opening defined by the frame and metal wire 12d is open as shown in FIG. 5A. When the raw slices come to the position under the conveyer 13, the cylinder pushes downward the center of the raw slice to form a recess thereat and supplies fillers thereinto, as shown in FIG. 5B. The recess of the raw slice having a recess packed with fillers is closed to form wantan 19 by clamping force of the frame and metal wire due to the deformation of the shaping frame, as shown in FIG. 5C, after passing through the portion where the second conveyer 13 is disposed. When the wantan 19 reaches the cylindrical brush 18, the deformed shaping frame is returned to the original configuration and the wantan is removed from the conveyer 1 by the brush to be fallen as shown in FIG. 5D.

As described above, the apparatus of the present invention may easily manufacture a great number of wantans containing fillers in an automatic manner.

What is claimed is:

1. Apparatus for manufacture of "wantans containing fillers" comprising:
   cutting means for dividing a raw layer into a plurality of raw slices;
   a filling station;
   first conveyor means for transferring raw slices from said cutting means through said filling station, said first conveyor means comprising a plurality of juxtaposed supporting plates having openings therethrough over which said raw slices may lay;
   second conveyor means disposed over said filling station and comprising a plurality of plates juxtaposed in the moving direction of said conveyor;
   at least one cylinder carried by each of said second conveyor means plates by which the center part of a raw slice may be pushed, during forward movement of said first and second conveyor means, into the corresponding opening in the corresponding supporting plate to form a recess and supply fillers into the recess of the raw slice;
   shaping means disposed on the underside of each said supporting plate and movable therewith;
   each shaping means comprising a frame formed with four pivotally jointed frame members permitting the frame to be moved from its rectangular configuration when under said filling station to a rhomboidal configuration downstream of the filling station so as to close the opening in the recess in a filled raw slice and form a wantan.

2. Apparatus according to claim 1 wherein each frame includes a handle to cause said frame to be deformed rhomboidally.

3. Apparatus according to claim 2 wherein said frame further includes means for clamping the opening of the recess.

4. Apparatus according to claim 3 wherein said clamping means has metal wires spaced at a proper interval and bridged between the opposite plates.

5. Apparatus according to claim 1 which further comprises means for removing the wantan from said conveyor means.

6. Apparatus according to claim 5 wherein said removing means includes a cylindrical brush.

7. Apparatus according to claim 1 wherein said cutting means comprises first and second cutting members, the first member slitting the raw layer into a plurality of raw strips and the second member transversely cutting the raw strips into a plurality of raw slices.

8. Apparatus according to claim 7 wherein said first cutting member includes a pair of rollers having cylindrical ribs formed on the periphery thereof.

9. Apparatus according to claim 8 wherein said second cutting member includes a first roller having a smooth cylindrical surface and a second roller having two ribs radially extending on the both sides and extending in a longitudinal direction of the roller, the ribs being intermittently contacted with said first roller during the rotation of the rollers.

* * * * *